United States Patent [19]

Rodefeld

[11] Patent Number: 5,078,110
[45] Date of Patent: Jan. 7, 1992

[54] METHOD AND ARRANGEMENT FOR DETECTING AND LOOSENING JAMMED ACTUATORS

[75] Inventor: Frank Rodefeld, Möglingen, Fed. Rep. of Germany

[73] Assignee: Robert Bosch GmbH, Stuttgart, Fed. Rep. of Germany

[21] Appl. No.: 477,952

[22] Filed: Jun. 7, 1990

[51] Int. Cl.⁵ .............................................. F02D 41/22
[52] U.S. Cl. ................................................ 123/399
[58] Field of Search ............................... 123/361, 399

[56] References Cited

U.S. PATENT DOCUMENTS

| | | | |
|---|---|---|---|
| 3,964,457 | 6/1976 | Coscia | 123/585 |
| 4,313,408 | 2/1982 | Collonia | 123/340 |
| 4,356,802 | 11/1982 | Kern et al. | 123/339 |
| 4,419,973 | 12/1983 | Collonia | 123/396 |
| 4,494,517 | 1/1985 | Kratt et al. | 123/585 |
| 4,519,360 | 5/1985 | Murakami | 123/361 |
| 4,823,749 | 4/1989 | Eisenmann et al. | 123/339 |

FOREIGN PATENT DOCUMENTS

| | | | |
|---|---|---|---|
| 3327376 | 2/1985 | Fed. Rep. of Germany | 123/399 |
| 2007878 | 5/1979 | United Kingdom | |
| 1602507 | 11/1981 | United Kingdom | |

Primary Examiner—Andrew M. Dolinar
Attorney, Agent, or Firm—Walter Ottesen

[57] ABSTRACT

A method and an arrangement are described for detecting a jammed or frozen actuator of an internal combustion engine, the actuator being shaken free in the case of a jamming.

14 Claims, 2 Drawing Sheets

METHOD AND ARRANGEMENT FOR DETECTING AND LOOSENING JAMMED ACTUATORS

FIELD OF THE INVENTION

The invention relates to a method and an arrangement for detecting and loosening jammed actuators.

BACKGROUND OF THE INVENTION

Such actuators have long been known, see for example U.S. Pat. No. 3,964,457 or U.S. Pat. Nos. 4,313,408 and 4,419,973. A specific embodiment of such an actuator drive, such as for example the duplex-winding rotary ,actuator, is described in British Patent 1,602,507. Idling control systems with a further actuator in a bypass channel, carrying auxiliary air, to the throttle flap for internal combustion engines are described, for example, in published British patent application 2,007,878 or U.S. Pat. No. 4,356,802. In such electromechanical actuators having a continuous characteristic, soiling or the formation of ice can, however, cause an increased hysteresis or else a jamming of the actuator to occur. So, in the past, designs for such actuators were devised which, in the case of a de-energized servo motor or in the case of a failure of the servo motor, moved the actuator with the aid of a spring into a defined throttling cross section which sufficed to supply the internal combustion engine with a quantity of air sufficient for the particular situation. Such a configuration is described in U.S. Pat. No. 4,494,517.

SUMMARY OF THE INVENTION

In contrast, the method and arrangement according to the invention for detecting and loosening jammed actuators has the advantage that the jamming of an actuator is detected and, by introducing the measures according to the invention, the actuator can in many cases be loosened again and an overshooting is avoided upon sudden overcoming of the resistance. It should be noted in this case, that depending on the type of the existing actuator, and in combination with a processor control of the drive system, no or only few additional components are necessary.

BRIEF DESCRIPTION OF THE DRAWING

The invention will now be described with reference to the drawings wherein.

DESCRIPTION OF THE PREFERRED EMBODIMENTS OF THE INVENTION

Figure 1:
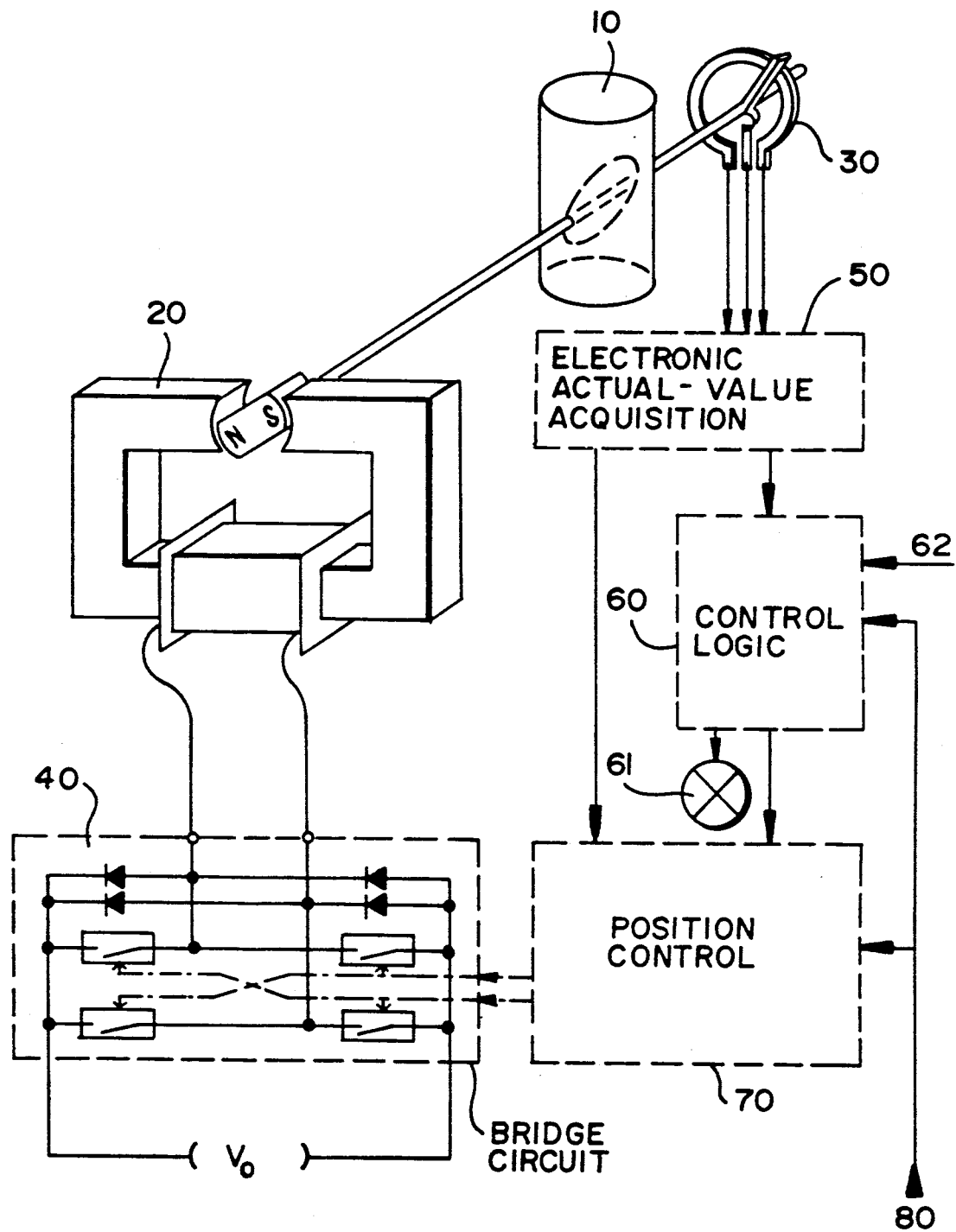
FIG. 1 is a schematic showing an arrangement of the invention which includes an actuator drive for driving an actuator in the form of a throttle flap to adjust the airflow to the engine and control means connected to the actuator drive.

FIG. 1 shows the elements by which the invention is to be explained. The actuator (throttle flap) is identified here by 10. The associated drive 20 and the actual-value signalling device 30 are fastened on the same axis of rotation. Downstream of the actual-value signalling device 30 is an electronic actual-value acquisition 50. From there, the actual value is supplied to the safety and control logic 60 according to the invention and to the position control 70. Furthermore, the safety and control logic 60 according to the invention can intervene in the position control. Downstream of the position control 70 is an output stage 40, which drives the actuator drive 20. The actuator desired value 80 is also supplied to the safety and control logic 60 and the position control 70. Furthermore, a fault signalling device 61 is connected to the control logic 60 and a specific operating state (for example starting case) can also be signalled to the control logic 60 by a separate input 62. In order to detect a jamming of the actuator, the difference between the actual value of the actuating variable and the given desired value of the actuating variable can be used. As soon as the difference exceeds a certain threshold, a jamming of the actuator is assumed. Furthermore, by summing up of the difference values in a certain time-slot pattern (integrating) a measure of the jamming of the actuator can be obtained. Furthermore, the jamming detection can be switched off if, for example, a device is present which is to sense the mechanical end stops, or if one of the mechanical end stops is to be approached, for example at the instant of starting. Such jams in the case of electromechanical actuators may be caused, for example, by soiling or the formation of ice.

Such electromechanical actuators are often driven by pulse signals of fixed frequency and variable pulse duration (pulse duty factor) in order to effect a continuous displacement. The frequency is selected such that the actuating variable, due to the mechanical inertia, is adjusted to be sufficiently smoothed. The small mechanical movements occurring are intended and serve to reduce the hysteresis of the actuator by avoiding static friction. The following methods are suitable as a measure for releasing jammed actuators:

(1) The control signal is constantly increased or decreased in a certain time-slot pattern, depending on the direction of the deviation of desired value and actual value. At the same time, when a threshold value of the difference between desired value signal and actual value signal is exceeded, the desired signal is no longer increased, in order to achieve a defined swing of the actuator to the current desired value without overshooting when release of the actuator is detected.

(2a) The frequency of the control signal (pulse signal) is reduced for a certain period of time to such an extent that it is around the resonant frequency of the actuator. A jamming can be released by the large changes in torque which occur. The pulse duty factor remains the same as at normal frequency in order that the average value of the actuating variable is also maintained after release. Thereafter, a transition back to normal pulse frequency is made.

(2b) With electric drives which can be operated actively in two directions, the drive is not only switched on and off at low frequency but is reversely driven.

The inertia (time constant) of the controlled system influenced by the actuating variable must be great, in relation to the low control frequency for the actuator, in order to obtain sufficiently small controlled variable amplitudes. This is generally the case with internal combustion engines.

Figure 2:
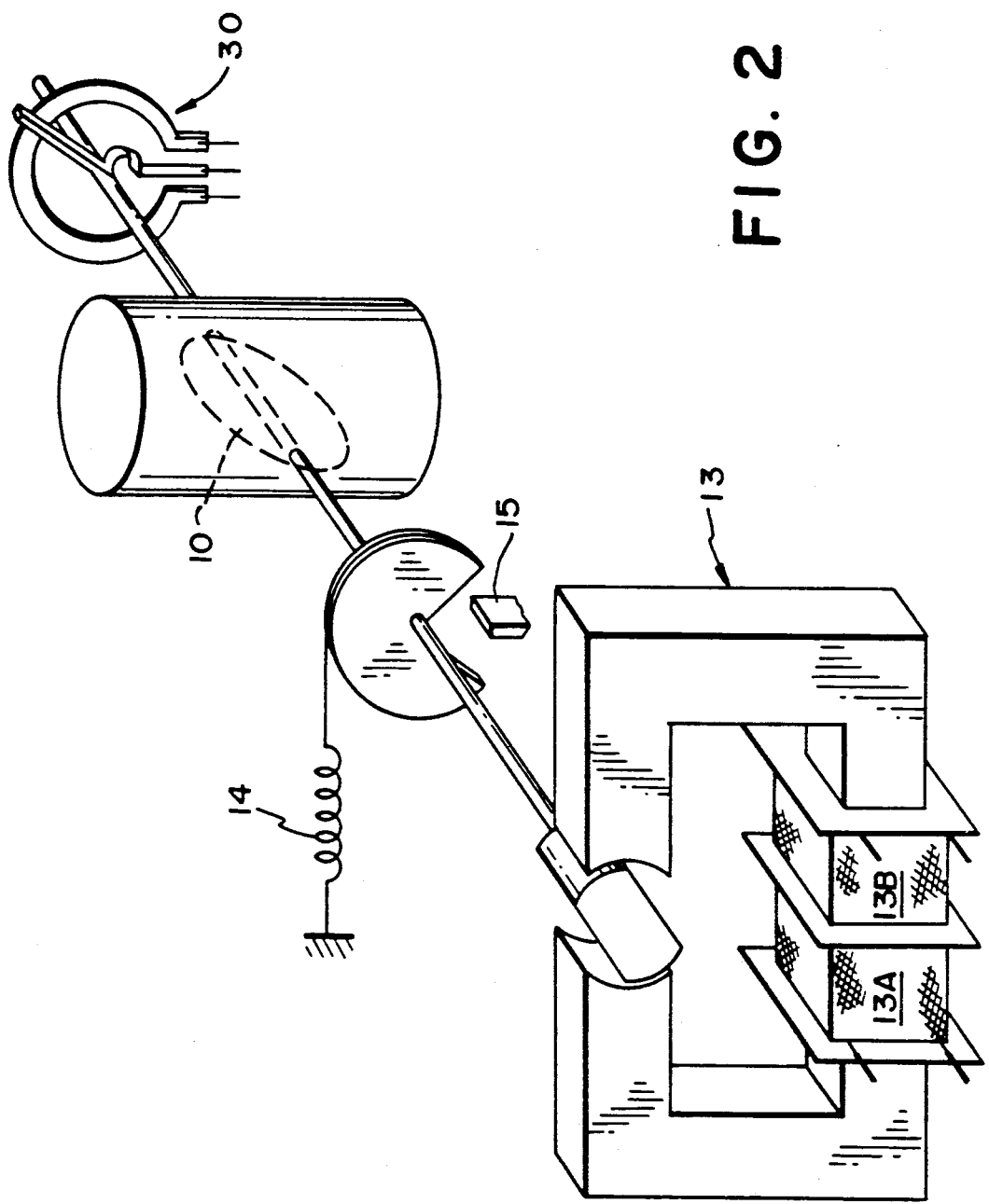
FIG. 2 is a schematic showing a duplex-winding rotary actuator drive and a spring for displacing the actuator into a specific rest position when the actuator is in the undriven condition.

In the figure of the exemplary embodiment, a drive is shown, which can be moved in two directions. For this reason, the output stage of the position control 70 is a bridge circuit 40. An equivalent effect can, however, also be achieved for the duplex-winding rotary actuator drive 13 having separate windings 13A and 13B as shown in FIG. 2 as well as for other drives. According to another feature of the invention, the actuator 10 can be adjusted into a rest position by a spring 14 when the actuator is in the undriven condition. Reference numeral 15 indicates an opening stop. A further advantageous embodiment of the invention is to be seen in that a fault message is sent to the driver if there is an isolated or repeated occurrence of jamming.

The exemplary embodiment described above is in no way to be understood as restrictive. Besides various already existing drive systems for actuators and the associated drive circuits possibly to be modified purely mechanical solutions for such a shaking drive are also conceivable. For example, in a purely mechanical drive, a shaking mechanism similar to a percussion drill could be activated by a slip clutch. Electromechanical solutions with an automatic interrupter (Wagner's hammer) are also conceivable. Furthermore, the invention can be applied both to a main throttle flap and to an actuator in a bypass line.

I claim:

1. In a process for adjusting an operating parameter of an internal combustion engine with an electromechanical actuator for adjusting the airflow to the engine with the airflow to the engine being controlled via the position of the actuator by an electronic control device in dependence upon a pregiven and an instantaneous position of the actuator, the process including a method of detecting and loosening the actuator when it is jammed, the method comprising the steps of:

detecting a jammed condition of the actuator from an increasing deviation between the pregiven position and the instantaneous position; and, causing said actuator to be subjected to a periodic shaking movement in order to loosen the actuator out of the jammed condition.

2. The method of claim 1, wherein the actuator is displaced into a specific rest position by a spring when in the undriven condition.

3. The method of claim 1, wherein the actuator is driven periodically at low frequency when shaken.

4. The method of claim 3, wherein the low frequency is in the vicinity of resonant frequency.

5. The method of claim 1, wherein the actuator is a duplex-winding rotary actuator and the shaking movement is generated by alternately driving the windings of the actuator.

6. The method of claim 1, wherein the actuator is a single-winding rotary actuator and the part driven by the winding is a permanent magnet.

7. The method of claim 1, wherein the shaking movement is caused by periodically alternately changing the polarity of the drive voltage or drive current.

8. The method of claim 1, wherein a resultant actuating torque is maintained in the direction of the desired displacement during the shaking movement.

9. The method of claim 1, wherein the actuator is carefully driven to the desired value in order to avoid an overshoot when a loosening of the jammed condition is detected.

10. The method of claim 1, wherein a shaking action becomes effective when the force of the restoring spring is inadequate to overcome the mechanical resistance or if the restoring spring is broken so that the actuator does not return to the rest position.

11. The method of claim 10, wherein the shaking action becomes effective with a resetting resultant actuating torque.

12. The method of claim 1, wherein after a single or repeated utilization of the shaking control, a fault message is outputted for the driver and/or the service.

13. In an apparatus for adjusting an operating parameter of an internal combustion engine having an electromechanical actuator for adjusting the airflow to the engine with the airflow to the engine being controlled via the position of the actuator by an electronic control device in dependence upon a pregiven and an instantaneous position of the actuator, an arrangement for detecting and loosening the actuator when it is jammed, the arrangement comprising:

detection means for detecting a jammed condition of the actuator in response to an increasing deviation between the pregiven position and the instantaneous position; and, control means for actuating said actuator to effect a periodic shaking movement of the actuator in order to loosen the actuator out of the jammed condition.

14. The arrangement of claim 13, further comprising signal means for supplying a fault signal to the driver or for maintenance personnel whenever there is a single or repeated activation of said control means.

* * * * *

UNITED STATES PATENT AND TRADEMARK OFFICE
CERTIFICATE OF CORRECTION

PATENT NO. : 5,078,110
DATED : January 7, 1992
INVENTOR(S) : Frank Rodefeld

It is certified that error appears in the above-identified patent and that said Letters Patent is hereby corrected as shown below:

On the title page, reference numeral [22]: delete "Filed: Jun.7, 1990" and substitute
-- PCT Filed: Nov. 12, 1988 -- therefor.

On the title page, insert after reference numeral [22]:

[86] PCT No.: PCT/DE88/00706
§ 371 Date:    Jun. 7, 1990
§ 102(e) Date: Jun. 7, 1990

[30] Foreign Application Priority Data

Dec. 21, 1987 [DE] Fed. Rep. of Germany ....3743309

In column 1, line 15: after "rotary", delete ",".

In column 1, line 53: after "and", insert -- , --.

Signed and Sealed this

Twenty-fourth Day of August, 1993

Attest:

BRUCE LEHMAN

Attesting Officer    Commissioner of Patents and Trademarks